(12) United States Patent
Schreiber et al.

(10) Patent No.: US 8,777,424 B2
(45) Date of Patent: Jul. 15, 2014

(54) PROJECTION DISPLAY HAVING KOHLER ILLUMINATION OF PROJECTION LENSES

(75) Inventors: Peter Schreiber, Jena (DE); Marcel Sieler, Jena (DE); Erik Foerster, Jena (DE)

(73) Assignee: Fraunhofer-Gesellschaft zur Foerderung der Angewandten Forschung E.V., Munich (DE)

( * ) Notice: Subject to any disclaimer, the term of this patent is extended or adjusted under 35 U.S.C. 154(b) by 357 days.

(21) Appl. No.: 12/998,045

(22) PCT Filed: Jun. 11, 2010

(86) PCT No.: PCT/EP2010/003525
§ 371 (c)(1),
(2), (4) Date: May 27, 2011

(87) PCT Pub. No.: WO2010/145784
PCT Pub. Date: Dec. 23, 2010

(65) Prior Publication Data
US 2011/0228231 A1     Sep. 22, 2011

(30) Foreign Application Priority Data
Jun. 15, 2009    (DE) .......................... 10 2009 024 894

(51) Int. Cl.
*G03B 21/20* (2006.01)
*G03B 21/26* (2006.01)
*G02B 3/00* (2006.01)
*G02B 9/00* (2006.01)
*G02B 27/10* (2006.01)

(52) U.S. Cl.
USPC ............... 353/94; 353/30; 353/102; 359/618; 359/649

(58) Field of Classification Search
USPC ................. 353/30–33, 38, 94, 100, 102, 122; 359/618, 649–651, 676, 741, 786, 359/796–797
See application file for complete search history.

(56) References Cited

U.S. PATENT DOCUMENTS

| 4,864,390 | A | * | 9/1989 | McKechnie et al. .......... 348/751 |
| 5,084,807 | A | * | 1/1992 | McKechnie et al. .......... 362/228 |
| 5,315,330 | A | * | 5/1994 | Hamada .......................... 353/31 |
| 5,515,123 | A | * | 5/1996 | Baldwin et al. ................ 353/102 |
| 5,825,443 | A | | 10/1998 | Kawasaki et al. |
| 6,325,514 | B1 | * | 12/2001 | Yamamoto ...................... 353/31 |
| 6,344,929 | B1 | | 2/2002 | Sugawara |

(Continued)

FOREIGN PATENT DOCUMENTS

| EP | 0366462 A2 | 5/1990 |
| EP | 0676902 A2 | 10/1995 |

(Continued)

*Primary Examiner* — Georgia Y Epps
*Assistant Examiner* — Jori S Reilly-Diakun
(74) *Attorney, Agent, or Firm* — Jacobson Holman, PLLC.

(57) ABSTRACT

A projection display having at least one light source and also regularly-disposed optical channels. The optical channels comprise at least one field lens, to which respectively one object structure to be imaged and also at least one projection lens are assigned. The distance of the projection lenses from the assigned object structures corresponds to the focal distance of the projection lenses while the distance of the object structures to be imaged from the assigned field lens is chosen such that a Köhler illumination of the assigned projection lens is made possible. Then the individual projections are superimposed to form the total image.

16 Claims, 11 Drawing Sheets

(56) References Cited

U.S. PATENT DOCUMENTS

| | | |
|---|---|---|
| 6,583,938 B1 | 6/2003 | Woodgate et al. |
| 7,072,096 B2 * | 7/2006 | Holman et al. ............... 359/298 |
| 7,400,439 B2 * | 7/2008 | Holman ....................... 359/298 |
| 2004/0080938 A1 * | 4/2004 | Holman et al. ............... 362/231 |
| 2006/0152931 A1 * | 7/2006 | Holman ....................... 362/297 |
| 2006/0285078 A1 | 12/2006 | Kasakumi et al. |
| 2008/0265148 A1 | 10/2008 | Gibson et al. |
| 2008/0310160 A1 | 12/2008 | Kim et al. |
| 2011/0304825 A1 * | 12/2011 | Sieler et al. .................... 353/20 |

FOREIGN PATENT DOCUMENTS

| | | |
|---|---|---|
| EP | 1385338 A1 | 1/2004 |
| EP | 1447704 A1 | 8/2004 |
| JP | 2004138881 A | 5/2004 |

\* cited by examiner

PROJECTION DISPLAY HAVING KÖHLER ILLUMINATION OF PROJECTION LENSES

This is a national stage of PCT/EP10/003525 filed Jun. 11, 2010 and published in German, which claims the priority of German number 10 2009 024 894.3 filed Jun. 15, 2009, hereby incorporated by reference.

The invention relates to a projection display having at least one light source and also regularly-disposed optical channels. The optical channels comprise at least one field lens, to which respectively one object structure to be imaged and also at least one projection lens are assigned. The distance of the projection lenses from the assigned object structures corresponds to the focal distance of the projection lenses whilst the distance of the object structures to be imaged from the assigned field lens is chosen such that a Köhler illumination of the assigned projection lens is made possible. Then the individual projections are superimposed to form the total image.

The projection of static and dynamic image contents onto a screen is produced with a diascope or a projection display having an imaging channel or three imaging optical channels for colour mixing or by a laser scanner. The miniaturisation required for use e.g. as mobile image-producing systems leads to loss of brightness of the projected image.

Conceivable fields of application reside hence in the field of personal communications and entertainment electronics, data visualisation in the home and in the car.

Approaches for resolving this problem are represented by colour-sequentially LED-illuminated picoprojectors (US 2006/0285078 A1), the miniaturisation of which however is possible only in a restricted manner because of the limitation of the transmittable light flux through the small surface. This interrelationship is determined by the optical law of conservation of étendue. The étendue or light guide value of a light source $$E = 4\pi n^2 A \sin^2\theta$$

is produced from its illuminating surface A, the half-angle of divergence θ and the refractive index n and remains constant in the case of an ideal optical image. Current lens systems increase the étendue or reduce the system transmission. Hence for a minimally transmittable light flux within a projecting optical system, a minimum required object surface is also necessary. In the case of single-channel projection systems, the constructional length of the system also increases because of optical laws (natural vignetting, imaging defects) to the same extent as this surface to be imaged, which makes miniaturisation difficult. As a result of the novel approach of the array projector presented here, this dependency between projection brightness and constructional length of the system is overcome.

Scanning laser projectors represent an alternative concept for radical miniaturisation of projection systems. Here, an image content is produced by scanning of a power-modulated laser beam over the image surface (US 20080265148). The brightness achievable with this approach is restricted above all by the low power of available single-mode lasers or their restricted modulation capacity. The speckle structures in the projected image, which limit the achievable resolution, are a further substantial disadvantage.

Starting herefrom, it was the object of the present invention to provide a projection display which has a small constructional height but enables high image brightness at the same time.

This object is achieved by the projection display having the features of claim 1. The further dependent claims reveal advantageous developments.

According to the invention, a projection display having at least one light source and regularly-disposed optical channels is provided, the optical channels having at least one field lens, to which respectively one object structure to be imaged and also at least one projection lens are assigned. The distance of the projection lenses from the assigned object structures corresponds approximately to the focal distance of the projection lenses, whilst the distance of the object structures to be imaged from the assigned field lens is chosen such that a Köhler illumination of the assigned projection lens is made possible. By superimposing the individual projection, an actual total image is then produced on a screen or a virtual total image.

Preferably, the regular arrangement of the optical channels has a further common field lens for compensating for the illumination telecentricity.

It is furthermore preferred that the optical channels have optical elements adapted with respect to the channels, in particular concentrators for masking the inactive regions between the field lenses.

The object structures preferably have a predistortion, with respect to the channels, for correcting distortions.

It is furthermore preferred that the projection lenses remote from the axes have a greater focal distance for correction of lack of focus due to the larger image distance of these channels.

Likewise, it is possible that the projection lenses remote from the axes are adapted, with respect to sagittal and tangential focal distance, by being designed as anamorphotic lenses, e.g. elliptical lenses, with respect to the channels, for compensation of astigmatism.

A preferred embodiment provides that at least one optical channel of the projection display has at least two projection lenses for aberration correction. It is particularly preferred here that all the optical channels are configured in this way.

It is preferred that at least a part of the optical channels has object structures buried below the field lenses in the form of a lithographically-structured object mask.

Preferably, the object structures can be disposed at least partially on a curved surface. It is hereby particularly preferred that the object structures are disposed on the curved field lens surface. Levelling-out of the field image can be achieved as a result of this arrangement.

Preferably, the projection display has a constructional length in the range of 0.5 to 10 mm.

A further preferred embodiment provides that the projection lenses have a reduced average distance (pitch) relative to the object structures, as a result of which the optical axes of the optical channels disposed further out are tilted.

As lenses, preferably elliptical lenses or anamorphotic lenses are used, as a result of which correction of the lack of focus and astigmatism of the peripheral optical channels can be achieved. It is likewise possible that the individual lenses differ with respect to other parameters.

It is preferred that the projection display is subdivided into three segments which are assigned respectively to a primary colour part, as a result of which a full colour projection is made possible.

Furthermore, it is preferred that the object structures are produced by a digital imager. In particular LCD or OLED displays are suitable for this purpose.

The subject according to the invention is intended to be explained in more detail with reference to the subsequent Figures without wishing to restrict said subject to the special embodiments shown here.

Figure 1:
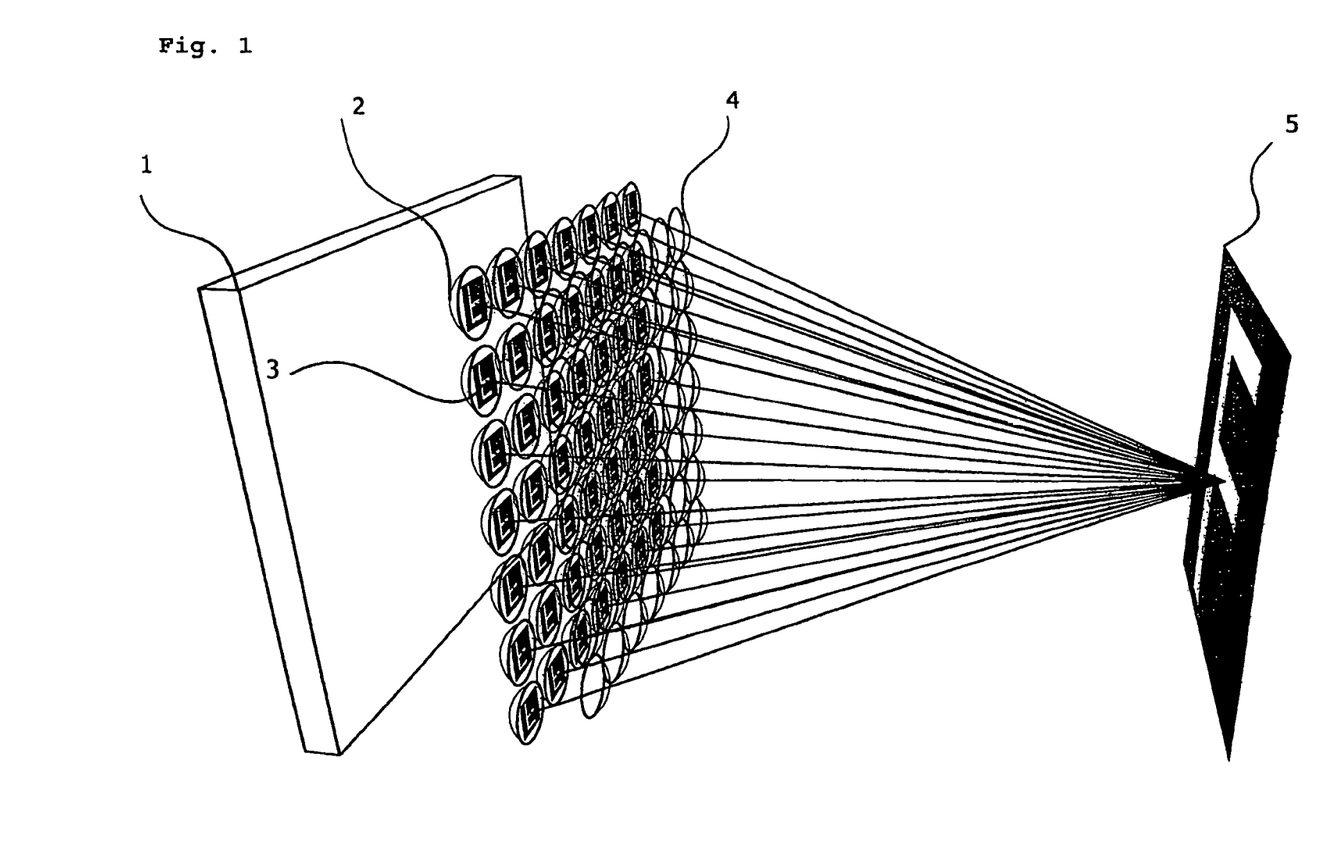
FIG. 1 and FIG. 2 show a first embodiment according to the invention of the projection display.
Figure 2:
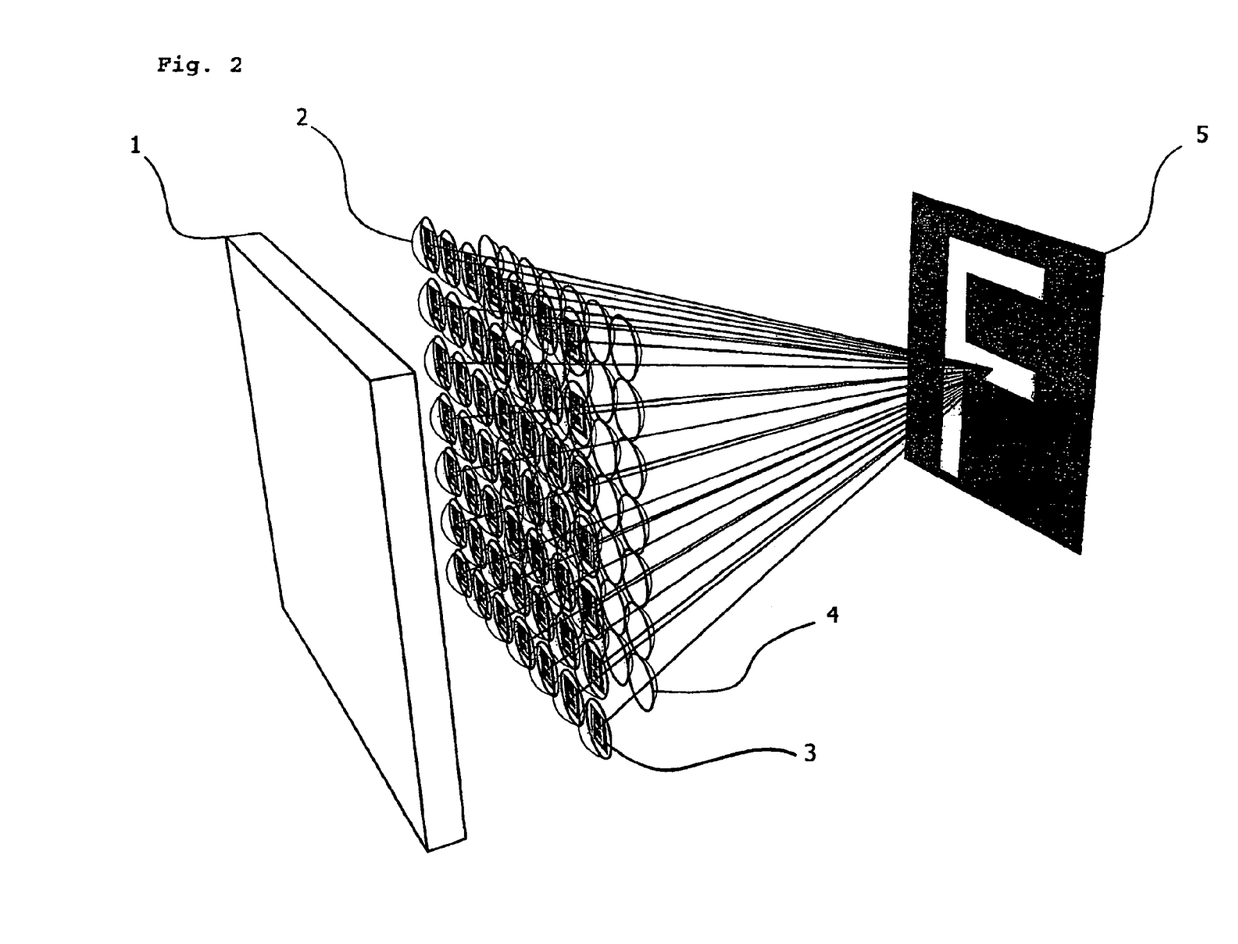

The ultraflat array projection display presents a new optical concept for producing very flat and simultaneously bright projection systems which is described with reference to an embodiment, given by way of example (FIG. 1/FIG. 2). The proposed arrangement consists of a regular arrangement of a plurality of field lenses of identical structures to be imaged and projection lenses. A light source (1) illuminates a field lens array (2), in the immediate vicinity of which the array of imaging structures (3) is situated. The respective object to be projected is situated in the focal distance of the assigned lens of the projection lens array (4). The corresponding field lens is situated very close to the object, in comparison with the distance of the projection lens from the object, in order to ensure a Köhler illumination of the projection lens. The projection lens array images a superimposition of all individual images onto a screen (5).

By using microlenses in a regular arrangement as projection lenses in a multiple-channel architecture, it is possible to reduce drastically the constructional length of the total system relative to conventional single-channel projectors of the same image brightness. Whilst the small constructional length of the projection system results from the focal distances of the lenses of only a few millimeters, the object surface multiplication ensures a proportional increase in image brightness. Hence, in comparison with single-channel projectors, system proportions with a greater lateral extension but with minimal constructional length are obtained.

Figure 3:
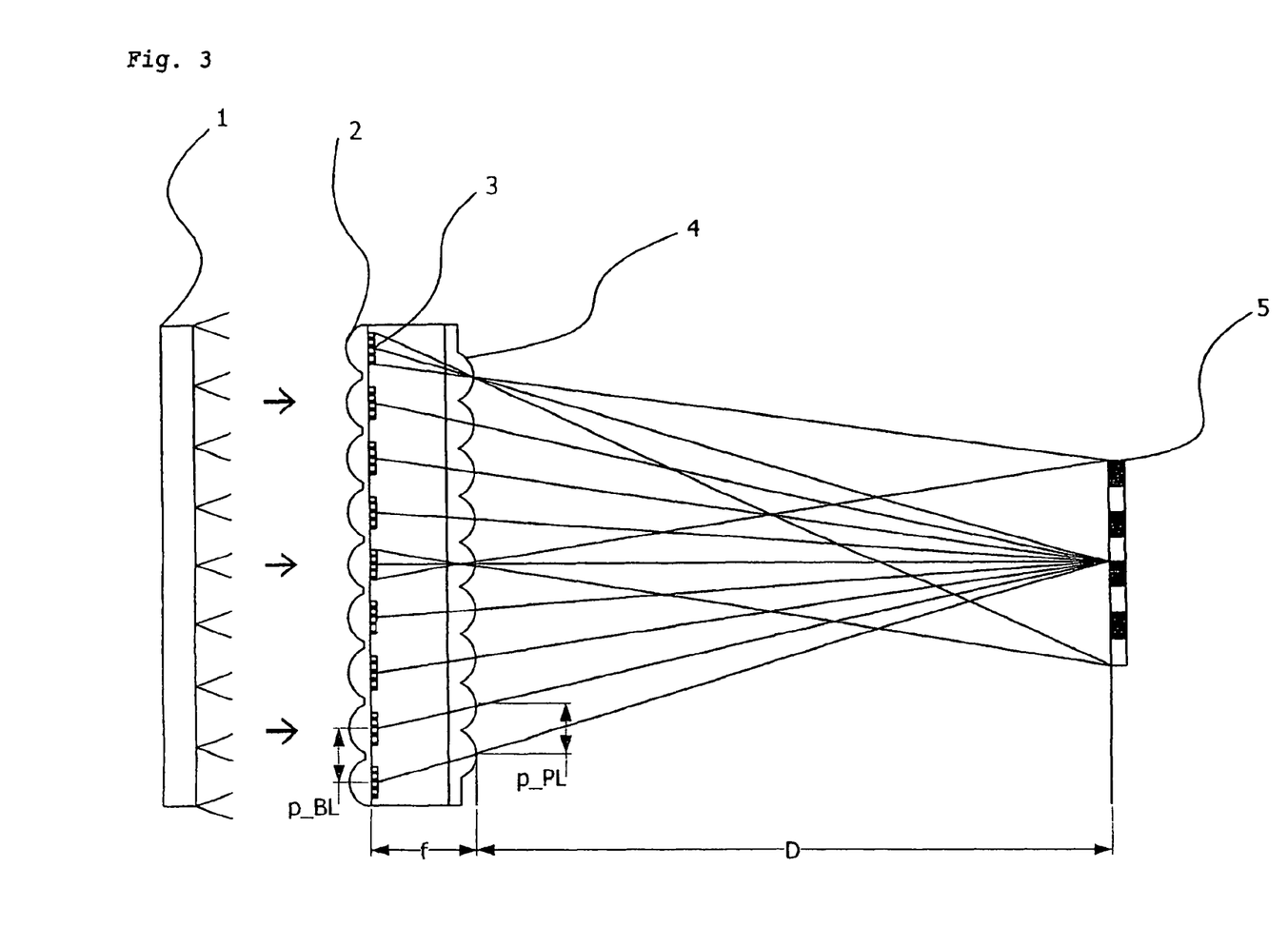
FIG. 3 shows a sectional representation of a projection display according to the invention.

As a result of a slightly reduced average distance (pitch) of the projection lenses relative to the imaging structures, an offset of the respective object and of the corresponding projection lens system which increases outwards from the array centre is produced. The thus resulting slight tilting of the optical axes of the outer projectors relative to that of the central channel ensure superimposition of the actual individual images at a finite distance D on the screen. No further macroscopic, optical elements are required for the projection. The projection distance D of the array projection display is produced from the focal distance of the projection lens f, the average distance of the projection lens systems $p_{PL}$, and the average distance of the images $p_{BL}$ (FIG. 3). The enlargement M of the array projection display follows from the ratio of the projection distance D to the focal distance of the projection lens f.

$$D = \frac{f^* p_{PL}}{p_{BL} - p_{PL}}$$

$$M = \frac{D}{f} = \frac{p_{PL}}{p_{BL} - p_{PL}}$$

The arrangement resembles the imaging part of a system for integral photography but shows substantial differences in function and arrangement: whilst in the case of integral photography a virtual image with 3-dimensional image contents is produced in transmitted light (no projection), the ultraflat array projection display generates a two-dimensional projection on a screen. The contents of the imaging structures within an integral imaging system deviate from each other continuously for generation of the spatial impression via the lens array. In the case of the presented invention, in contrast identical objects are projected.

Due to the superimposition of the projections of projection lenses with Köhler illumination, the system achieves homogenisation of the light source in parallel with the projection, which makes additional measures necessary in conventional single-channel projection systems.

Figure 4:
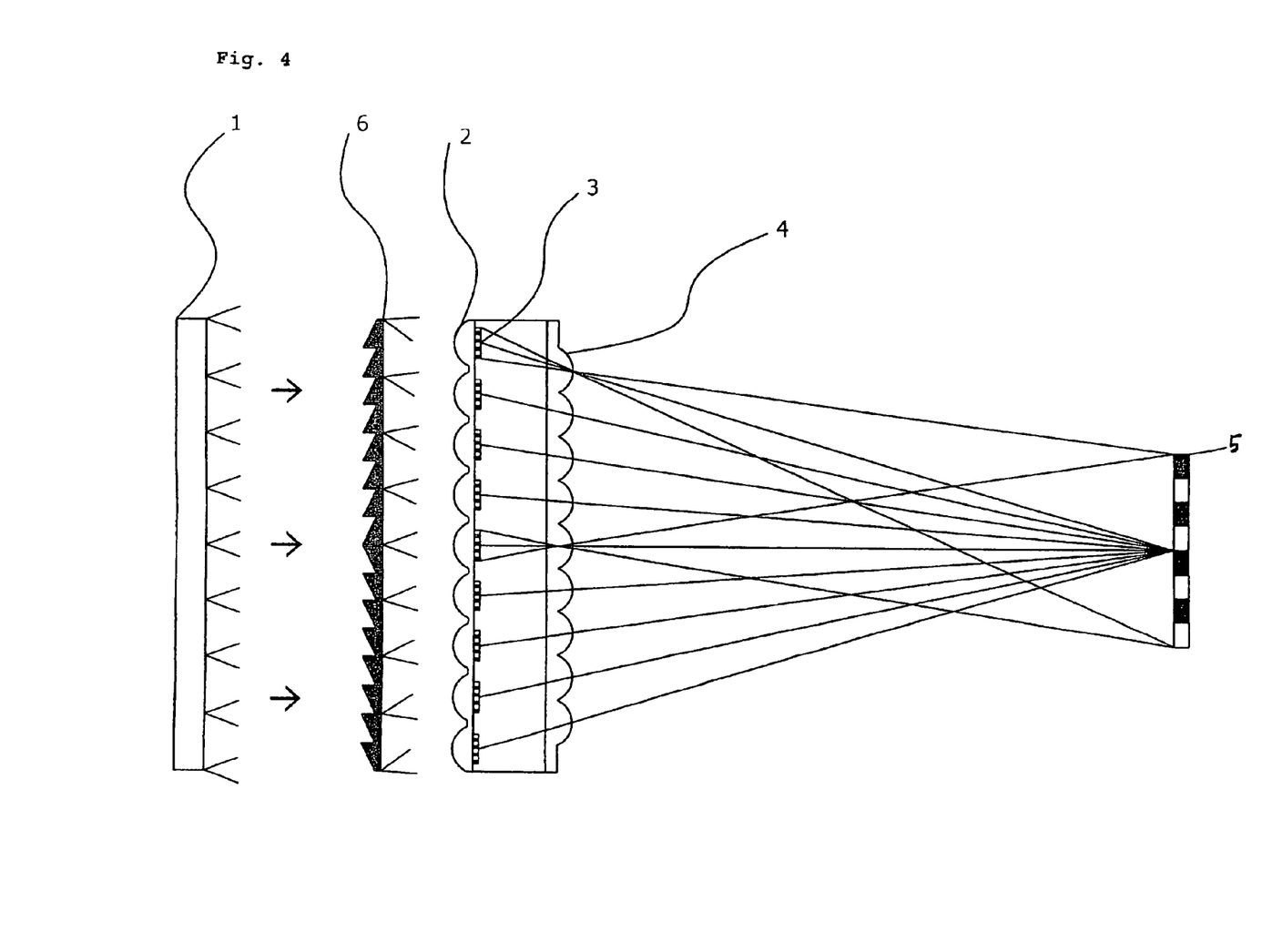
FIG. 4 shows, in a sectional representation, a projection display according to the invention with additional macroscopic field lens.
Figure 5:
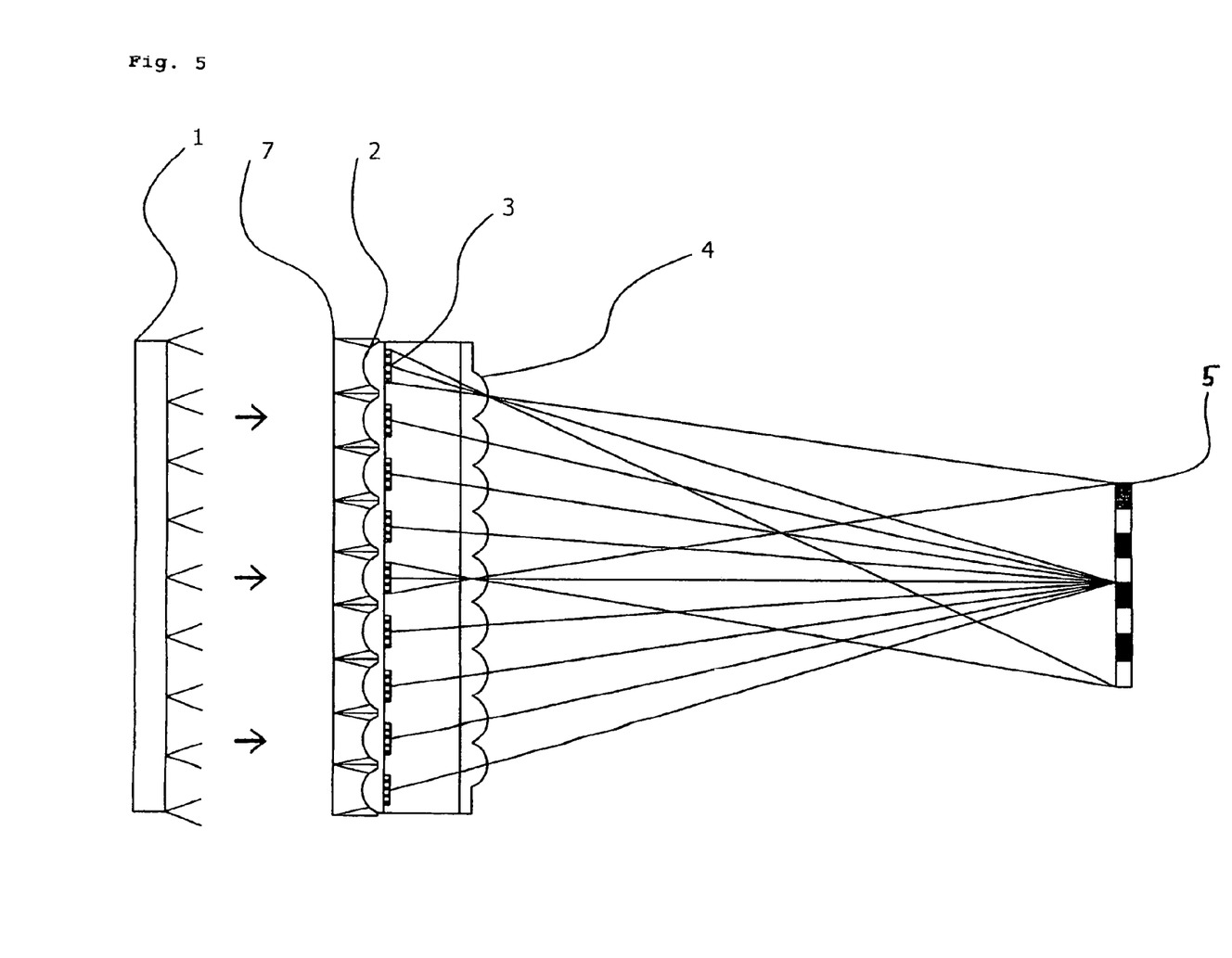
FIG. 5 shows a projection display according to the invention in combination with concentrators in a sectional representation.

The maximum aperture angle of the light source should not exceed the acceptance angle of the field lens, at which the exit pupil of the projection lens is fully illuminated since otherwise interfering images adjacent to the actual image can be produced. As illumination, for example very flat units, similar to the rear-lighting of transmissive displays (US 020080310160 A1) with adapted coupling-out structures can be used. The acceptance angle of peripheral individual projectors of the projector array is restricted by the telecentric radiation characteristic of the source in comparison with the central projection channel. An additional macroscopic field lens e.g. in the form of a thin Fresnel lens (6) can eliminate this telecentricity and hence further increase the total brightness of the projection (FIG. 4). Applying suitable light-guiding elements, e.g. concentrators (7), as part of the field lens array can mask the dead zones between the field lenses and hence significantly increase the filling factor (FIG. 5).

The use of lens arrays with parameters which are continuously variable over the array (e.g. different focal distances of the projection lenses over the array or different focal distances tangentially and sagittally by forming as elliptical lenses) can achieve correction of the lack of focus and astigmatism of the peripheral projection lenses. In order to suppress the effect of distortion both of the individual channel and of the superimposition of all imaging channels, a predistortion, with respect to the channels, of the imaging structures is possible.

Figure 6:
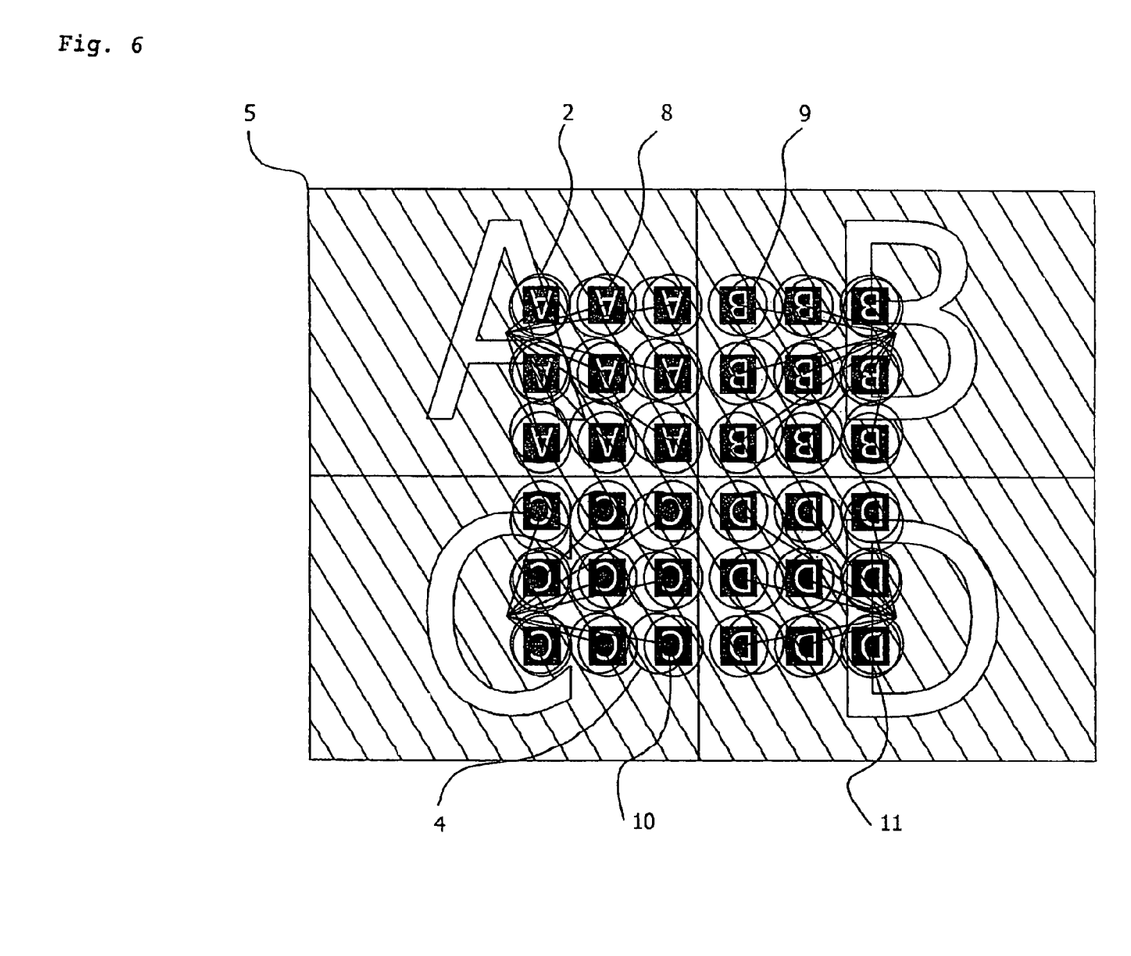
FIG. 6 and FIG. 7 show schematically segmentation of the projection image of a projection display according to the invention.
Figure 7:
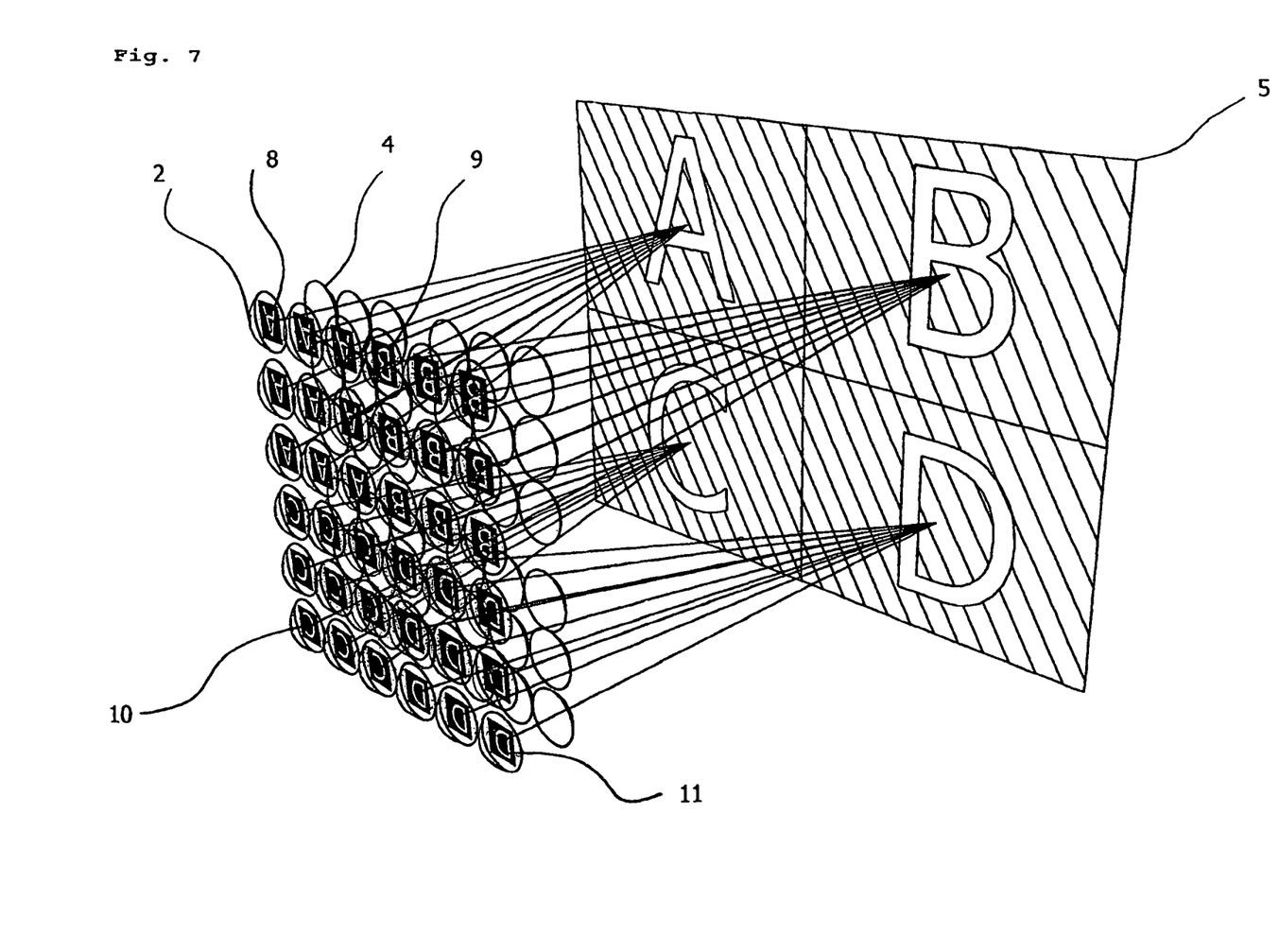

The use of microlenses of a short focal length is associated with a restriction in the transmittable information. The displayable image resolution is limited by the superimposition of aberrations and diffraction effects. An increase in the total information transmission is possible by segmentation of the projection image and allocation of defined visual field regions to groups of individual projectors (8-11) in a restricted arrangement within an array projection display (FIG. 6/FIG. 7).

Figure 8:
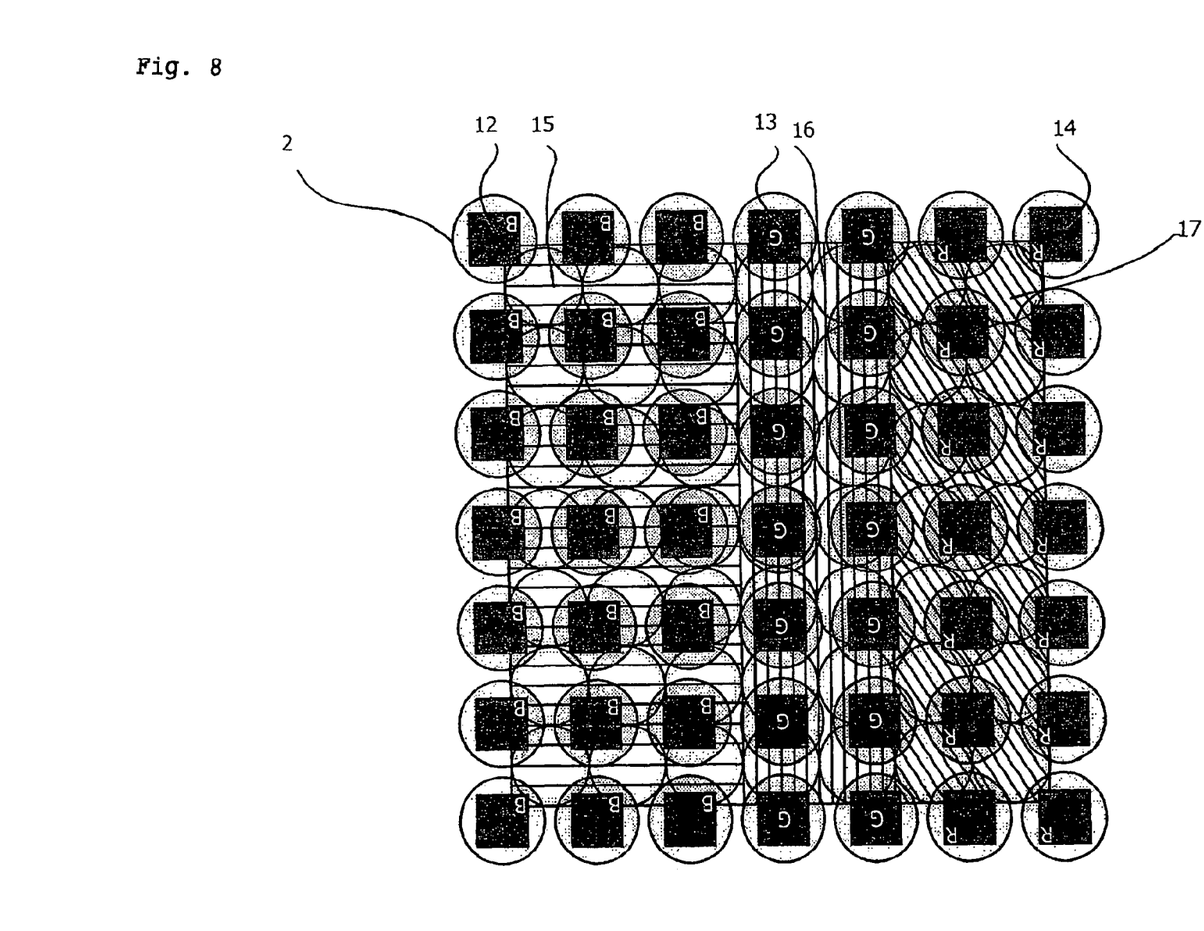
FIG. 8 and FIG. 9 show schematically the production of a full colour projection with a projection display according to the invention.
Figure 9:
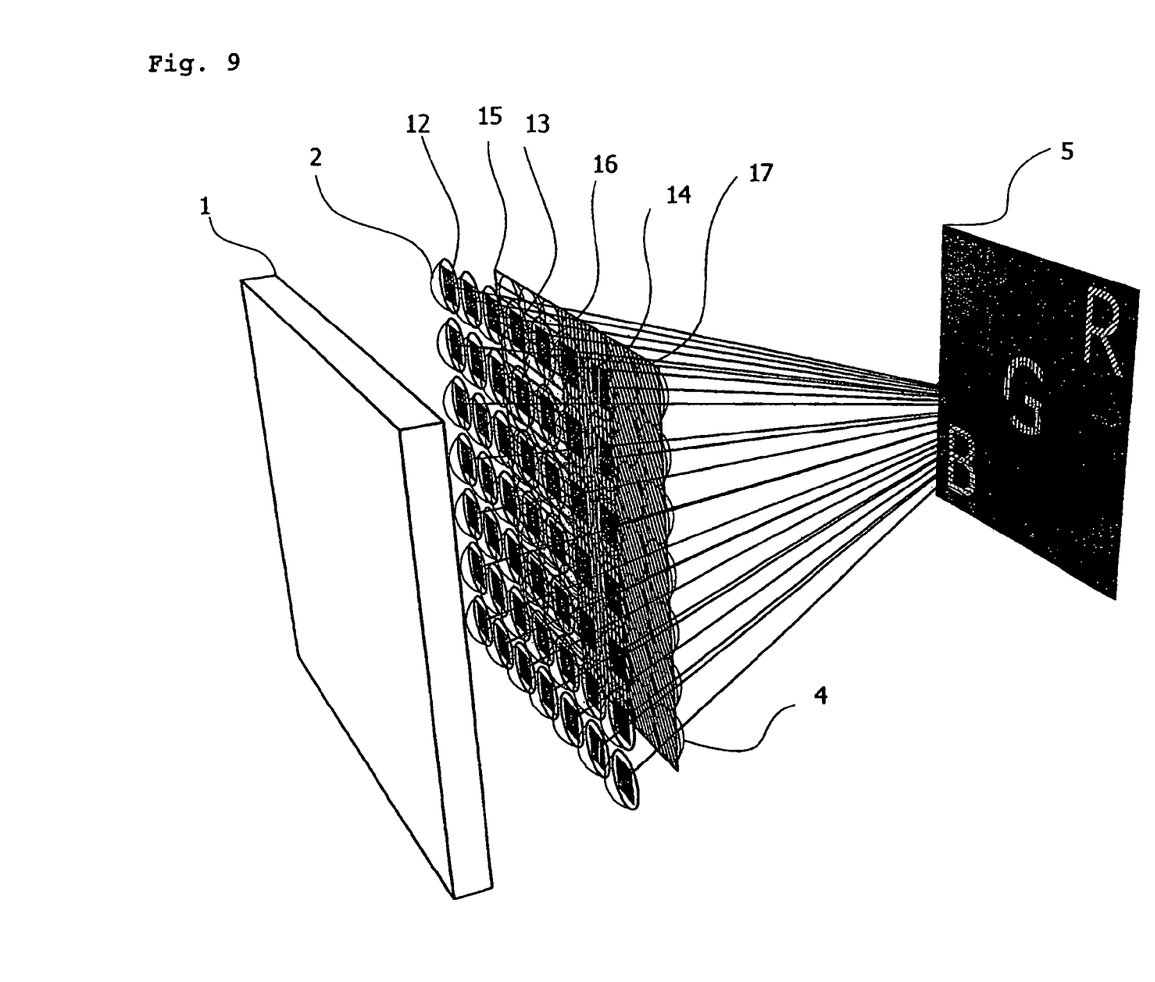

A full colour projection is made possible by interweaving three array projection displays, each of which represents a primary colour part of the image to be projected in the form of identical object structures (12-14) (FIG. 8/FIG. 9). This approach is distinguished relative to the colour structuring of RGB subpixels with micrometer dimensions by technological simplicity on the basis of the substantially larger colour filter structures (15-17) assigned to the respective channels in the region of several 100 μm. Relative to normal colour-sequential picoprojectors (see above), there are no interfering colour effects during projection onto moving surfaces. Furthermore, the possibility exists of channel-wise colour defect correction which, in comparison with conventional single-channel projection systems with complex achromatised multiple-lens projection lenses, represents a drastic simplification in the projection lens system.

If the object structure is generated by a digital imager which shows an array of identical images at a variable pitch as image content, the projection display enables the display of dynamic image contents. By electronic offset of the individual images on the imager, the projection distance can be controlled without mechanical components (see above formula for the projection distance D). In combination with a distance measurement from the screen, the projection distance can hence be tracked electronically within a control circuit.

Figure 10:
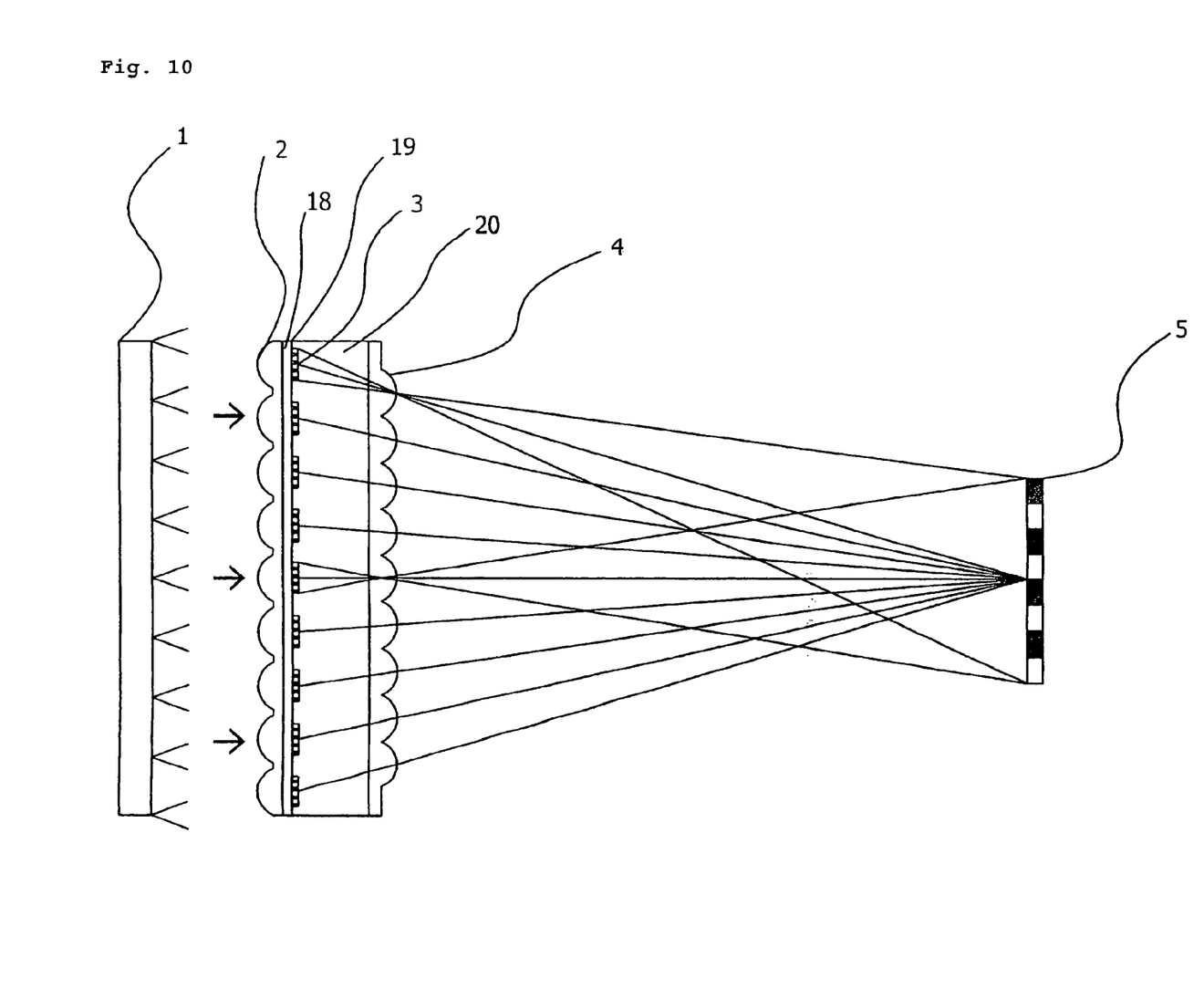
FIG. 10 shows a projection display according to the invention in combination with an LCD display in a sectional representation.
Figure 11:
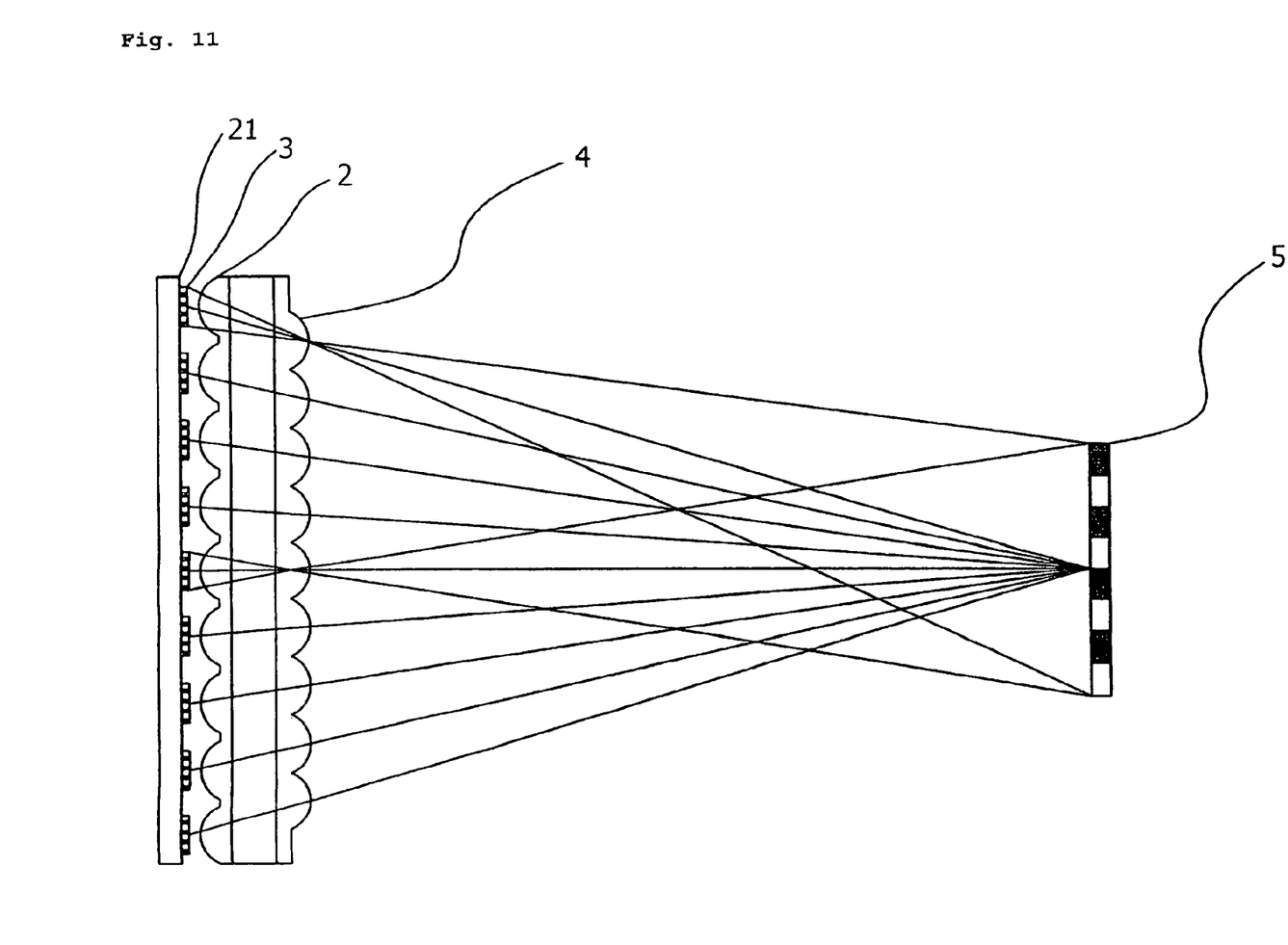
FIG. 11 shows a projection display according to the invention in combination with an OLED display in a sectional representation.

The imager can be for example a transmissive LCD display (FIG. 10). In a monolithic construction, the field lenses (2) are structured here directly on the thin cover glass (18) of the active LED plane (19). The glass substrate (20) of the LCD can serve at the same time as substrate for the projection lens array (4). The colour filter array can be buried either below the field—or the projection lens array or be applied on the latter from outside. Another embodiment with an actively-emitting OLED display (FIG. 11) consists merely of the tandem lens array, the field lenses here being disposed in the light path directly behind the imaging structures. The colour display can be buried again in the array in the case of white-emitting OLEDs or produced externally on the colour filter applied on the array. An advantageous embodiment is possible with clusters of OLEDs respectively radiating monochrome red, green and blue which are assigned respectively to one projection lens system. Of course, colour systems are then no longer required and a higher system transmission is thus achieved. Embodiments with reflective displays are likewise conceivable.

The invention claimed is:

1. A projection display having at least one light source and regularly-disposed optical channels, each comprising at least one field lens, to each of which one object structure to be imaged and at least one projection lens are assigned, wherein for each regularly-disposed optical channel the distance from the at least one projection lens to the object structure corresponds to the focal distance of the projection lens and the distance from the identical object structure to the at least one field lens is chosen such that a Köhler illumination of the at least one projection lens is made possible, and wherein the at least one projection lenses assigned to the regularly-disposed optical channels produce individual projections which are superimposed to form an actual total picture on a screen or a virtual total picture.

2. A projection display according to claim 1, wherein each of the optical channels has a further common field lens for compensating for the illumination telecentricity.

3. A projection display according to claim 1, wherein each of the optical channels have optical elements adapted with respect to the channels, the optical elements comprising concentrators for masking the inactive regions between the field lenses.

4. A projection display according to claim 1, wherein each of the object structures have a predistortion, with respect to the channels, for correction of a distortion.

5. A projection display according to claim 1, wherein the projection lenses remote from an optical axis of a central optical channel have a greater focal distance for correction of a lack of focus due to the larger image distance of these channels.

6. A projection display according to claim 5, wherein the projection lenses remote from an optical axis of a central optical channel are adapted, with respect to sagittal and tangential focal distance, by being designed as anamorphotic lenses, with respect to the channels, for compensation of astigmatism.

7. A projection display according to claim 1, wherein said at least one optical channel has at least two projection lenses for aberration correction.

8. A projection display according to claim 1, wherein said at least a part of the optical channels have object structures buried below the field lenses in the form of a lithographically-structured object mask.

9. A projection display according to claim 1, wherein the object structures are disposed at least partially on a curved surface comprising at least a surface of the associated at least one field lens in order to level out the image field.

10. A projection display according to claim 1, wherein the projection display has a constructional length in the range of 0.5 to 10 mm.

11. A projection display according to claim 1, wherein the projection lenses have a reduced average distance relative to the object structures, as a result of which the optical axes of the outer optical channels are tilted.

12. A projection display according to claim 1, wherein the projection display is subdivided into three segments which are assigned respectively to a primary color part, as a result of which a full color projection is made possible.

13. A projection display according to claim 12, wherein the number of lenses assigned to the respective primary color and object structures is chosen such that a white balance which compensates for the spectral properties of the source or of the source and a plurality of color filters is made possible with simultaneous maximization of the image brightness.

14. A projection display according to claim 1, wherein the object structure is produced by a digital imager comprising an LCD display or an OLED display.

15. A projection display according to claim 1, wherein the projection display has a unit for electronic offset of the individual images, as a result of which a projection distance is controlled.

16. A projection display according to claim 15, wherein the projection display has a unit for measuring the distance from the screen, which, in combination with the unit for the electronic offset, enables electronic tracking of the projection distance.

* * * * *